(12) United States Patent
Venkatraman et al.

(10) Patent No.: US 11,886,270 B2
(45) Date of Patent: Jan. 30, 2024

(54) POWER-EFFICIENT DYNAMIC APPLICATION CONTENT DISPLAY FOR ELECTRONIC DEVICES

(71) Applicant: Apple Inc., Cupertino, CA (US)

(72) Inventors: Kartik R. Venkatraman, San Francisco, CA (US); Manish Chandra Reddy Ravula, Cupertino, CA (US); Roberto Alvarez, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/679,049

(22) Filed: Feb. 23, 2022

(65) Prior Publication Data

US 2023/0099002 A1   Mar. 30, 2023

Related U.S. Application Data

(60) Provisional application No. 63/248,346, filed on Sep. 24, 2021.

(51) Int. Cl.
*G06F 1/3234* (2019.01)
*G06F 1/3212* (2019.01)
*G06F 1/3218* (2019.01)

(52) U.S. Cl.
CPC .......... *G06F 1/3265* (2013.01); *G06F 1/3212* (2013.01); *G06F 1/3218* (2013.01)

(58) Field of Classification Search
CPC .... G06F 1/3265; G06F 1/3212; G06F 1/3218; G06F 1/3228; G06F 1/3231; G09G 2320/0626; G09G 2330/021; G09G 5/006; Y02D 10/00

USPC ........................................................ 713/320
See application file for complete search history.

(56) References Cited

U.S. PATENT DOCUMENTS

| 5,822,599 A * | 10/1998 | Kidder ................. G06F 1/3265 |
| | | 345/212 |
| 9,781,542 B2 | 10/2017 | Rangarajan |
| 10,346,900 B1 | 7/2019 | Wilson et al. |
| 2007/0130541 A1 | 6/2007 | Louch et al. |

(Continued)

FOREIGN PATENT DOCUMENTS

WO   WO 2017/192327   11/2017

OTHER PUBLICATIONS

International Search Report and Written Opinion from PCT/US2022/031470, dated Oct. 7, 2022, 11 pages.

*Primary Examiner* — Chun Cao
(74) *Attorney, Agent, or Firm* — BAKERHOSTETLER

(57) ABSTRACT

Aspects of the subject technology relate to power consuming processes of electronic devices. For example, an electronic device may create, initiate, and/or modify a power consuming process of the electronic device, based in part on user power consumption information that indicates a typical amount of power consumed by a user of the electronic device. The electronic device may recommend increases in power consumption for low power consumption users and/or decreases in power consumption for high power consumption users. A power consumption process may include a visual arrangement of graphical elements that each display periodically, occasionally, and/or continuously updated information from the application, when a full user interface of the application is not displayed.

18 Claims, 10 Drawing Sheets

(56) References Cited

U.S. PATENT DOCUMENTS

| | | | |
|---|---|---|---|
| 2008/0195961 A1* | 8/2008 | Bae | G06F 3/0488 |
| | | | 715/769 |
| 2010/0058248 A1 | 3/2010 | Park | |
| 2015/0100801 A1 | 4/2015 | Maity | |
| 2018/0121060 A1* | 5/2018 | Jeong | G06F 3/0488 |
| 2018/0188906 A1* | 7/2018 | Carter | G06F 3/0482 |
| 2019/0121420 A1 | 4/2019 | Kaza | |
| 2021/0255746 A1 | 8/2021 | Hu et al. | |
| 2021/0286510 A1* | 9/2021 | Tyler | G06F 3/0484 |
| 2021/0397313 A1 | 12/2021 | Desai et al. | |

\* cited by examiner

POWER-EFFICIENT DYNAMIC APPLICATION CONTENT DISPLAY FOR ELECTRONIC DEVICES

CROSS REFERENCE TO RELATED APPLICATIONS

This application claims the benefit of priority to U.S. Provisional Patent Application No. 63/248,346, entitled "Power-Efficient Dynamic Application Content Display For Electronic Devices," filed on Sep. 24, 2021, the disclosure of which is hereby incorporated herein in its entirety.

TECHNICAL FIELD

The present description relates generally to electronic devices, including, for example, power-efficient dynamic application content display for electronic devices.

BACKGROUND

Electronic devices often include applications that provide information for display in a user interface of the application. To access the information from an application, a user typically needs to launch the application, wait for the application to launch, and navigate to a relevant section of the user interface of the application that displays the information. Some devices also provide a miniaturized user interface that displays updates to a limited amount of the information corresponding to the application on a home screen of the device.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Implementations of the subject technology described herein provide for power-aware generation of visual arrangements of graphical elements that each correspond to an underlying application of an electronic device. The visual arrangements may be generated by an electronic device based on user power consumption and based on power consumption of the graphical elements in the visual arrangement. For example, an electronic device of a low power consumption user may display a visual arrangement that includes one or more high power consumption graphical elements (e.g., graphical elements that are frequently updated on the display, graphical elements for which their underlying applications frequently obtain and/or generate new data for the updates, and/or graphical elements for which the underlying application uses a relatively large amount of power to obtain the data for the updates to the graphical element). A graphical element may be referred to, in some use cases, as a "widget". A graphical element or a widget may be understood, for example, as a graphical display element that is persistently displayed or accessible for display overlaid on a portion of a home screen or other screen of a device operating system or an electronic device, and that receives and displays updates to application-specific information for an underlying application for which the full user interface of the application is not currently displayed.

In one or more implementations user power consumption information can be used to modify an existing visual arrangement of graphical elements, and/or to modify other features and/or power consuming processes of an electronic device, such as a display brightness, a display resolution, or a sub-process of a full application user interface (as examples).

Figure 1:
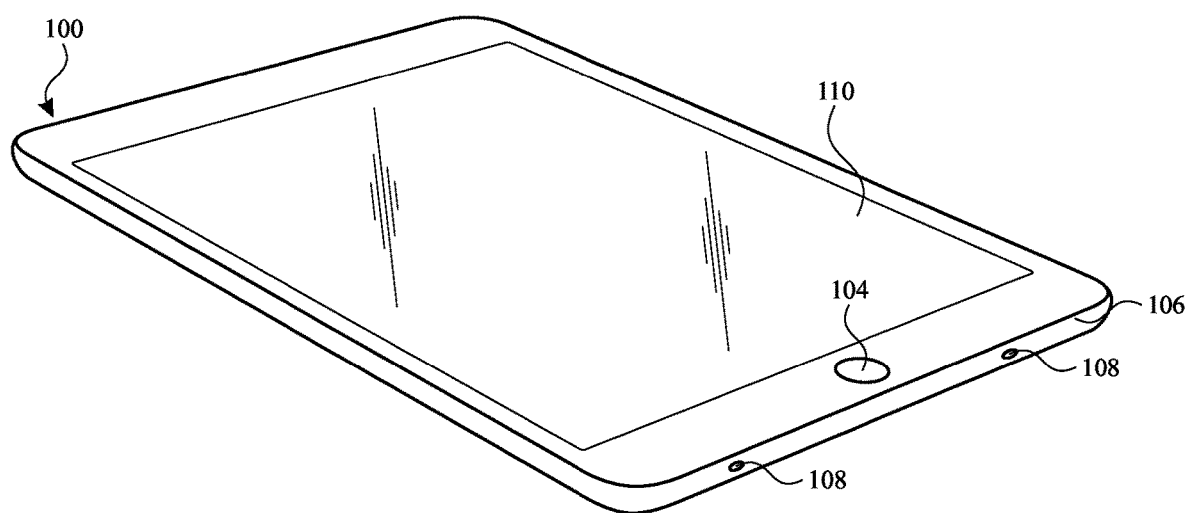
FIG. 1 illustrates a perspective view of an example electronic device that may implement various aspects of the subject technology.

An illustrative electronic device that may display a visual arrangement of graphical elements and/or that may modify a power consuming process based on user power consumption information is shown in FIG. 1. In the example of FIG. 1, electronic device 100 has been implemented using a housing that is sufficiently small to be portable and carried by a user (e.g., electronic device 100 of FIG. 1 may be a handheld electronic device such as a tablet computer, a cellular telephone, a smartwatch, a laptop, and the like). As shown in FIG. 1, electronic device 100 includes a display such as display 110 mounted on the front of housing 106. Electronic device 100 includes one or more input/output devices such as a touch screen incorporated into display 110, a button or switch such as button 104 and/or other input output components disposed on or behind display 110 or on or behind other portions of housing 106. Display 110 and/or housing 106 include one or more openings to accommodate button 104, a speaker, a light source, or a camera.

In the example of FIG. 1, housing 106 includes openings 108 on a bottom sidewall of housing 106. One or more of openings 108 forms a port for an audio component. Housing 106, which may sometimes be referred to as a case, may be formed of plastic, glass, ceramics, fiber composites, metal (e.g., stainless steel, aluminum, etc.), other suitable materials, or a combination of any two or more of these materials.

The configuration of electronic device 100 of FIG. 1 is merely illustrative. In other implementations, electronic device 100 may be a computer such as a computer that is integrated into a display such as a computer monitor, a laptop computer, a wearable device such as a smart watch, a pendant device, or other wearable or miniature device, a media player, a gaming device, a navigation device, a computer monitor, a television, a headphone, or other electronic equipment having a display. In some implementations, electronic device 100 may be provided in the form of a wearable device such as a smart watch. In one or more implementations, housing 106 may include one or more interfaces for mechanically coupling housing 106 to a strap or other structure for securing housing 106 to a wearer.

Figure 2:
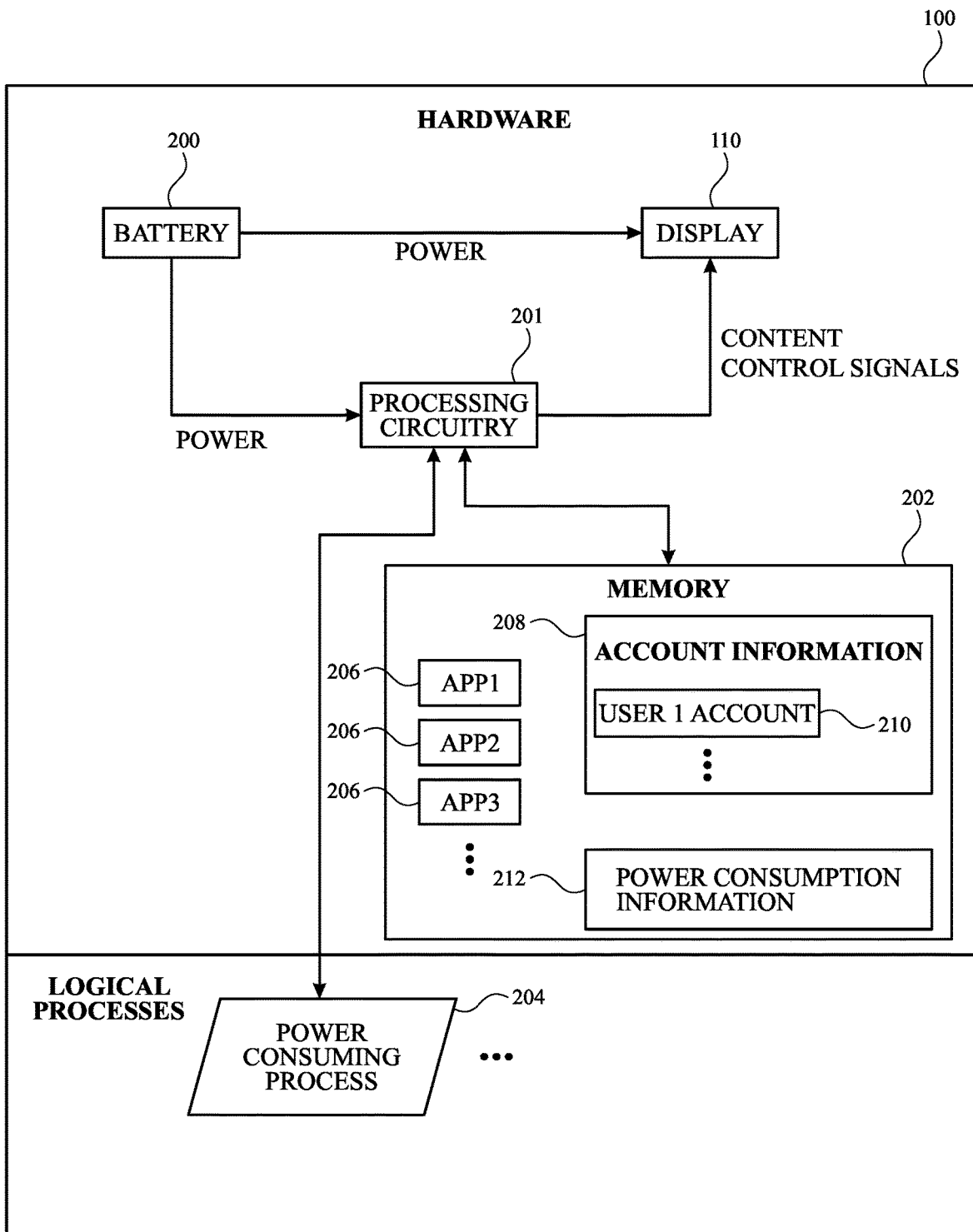
FIG. 2 illustrates an example architecture that may be implemented by an electronic device, in accordance with one or more implementations.

FIG. 2 illustrates an example architecture that may be implemented by the electronic device 100 in accordance with one or more implementations of the subject technology. For explanatory purposes, portions of the architecture of FIG. 2 is described as being implemented by the electronic device 100 of FIG. 1, such as by a processor and/or memory of the electronic device; however, appropriate portions of the architecture may be implemented by any other electronic device. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

Various portions of the architecture of FIG. 2 can be implemented in software or hardware, including by one or more processors and a memory device containing instructions, which when executed by the processor cause the processor to perform the operations described herein. In the example of FIG. 2, the electronic device 100 includes hardware components such as display 110, a battery 200, processing circuitry 201, and memory 202. In this example, the electronic device 100 also includes one or more logical process such as a power consuming process 204. For example, the power consuming process 204 may be a logical process that is executed from the memory 202 by the processing circuitry 201.

As shown in the example of FIG. 2, the memory 202 may store executable code for one or more applications 206. In the example of FIG. 2, the memory 202 stores code for three applications 206 (e.g., "APP1", "APP2", and "APP3"). However, this is merely illustrative, and it is understood that the memory 202 can store code for one application 206, two applications 206, more than three application 206, or generally any number of applications 206. The applications 206 may, for example, have been previously downloaded from application store server. One or more of the applications 206 may be associated with a graphical element that displays periodically, occasionally, or continuously updating application-specific information while the application and/or a full user interface of the application is inactive. For example, applications 206 can obtain and/or provide data for display in a corresponding graphical element in advance of the data being displayed (e.g., with instructions for how to display the data and timing information for when to display the data), so that a system process of the electronic device 100 can update the graphical element on the display for at least a period of time while the application itself is inactive (e.g., and before a next set of updated data for display is to be obtained and/or generated for a next period of time). In one or more implementations, one or more of the applications 206 may also be provided with a respective data extension. The data extensions may be lightweight data providers that enable graphical elements of the applications to be updated without querying data directly from the associated application, thereby bypassing a computationally expensive waking or launching of application to obtain updated data for display by a graphical element.

The power consuming process 204 may be, in one or more use cases, one of the applications 206 for which code from memory 202 is being executed by the processing circuitry 201. For example, power from the battery 200 can be consumed by the processing circuitry 201 and the display 110 when a full user interface or a graphical element of an application 206 is displayed. The power can be consumed by the processing circuitry 201 for executing the application, for communicating over a wired or wireless connection with another device or system to obtain data for the application, and/or for operating the display to display the full user interface of the application. Power can also be consumed by the processing circuitry 201 for obtaining and/or generating data for display in the graphical element of the application, and/or for updating the displayed data in the graphical element on the display. The amount of power consumed for operating a graphical element (e.g., for obtaining the data and for displaying the data) can vary from application to application, and from graphical element to graphical element (e.g., depending on the frequency with which displayed data is updated on the display, the frequency with which new data is obtained and/or generated for display updates, and/or an amount of processing and/or communications that are performed to obtain and/or generate each update). In one or more use cases, the power consuming process 204 may include multiple processes, such as multiple graphical elements of multiple applications 206 that are displayed in a visual arrangement by the display 110. In one or more implementations, an application 206 may have more than one version of a corresponding graphical element. For example, a surf application may have a first version of a graphical element that displays only tide information, and a second version of the graphical element that displays tide, swell, water temperature, air temperature, and/or other surfing, sea, and/or weather information that may be relevant to a surfer. In this example, the first version of the graphical element for the surf application may be a lower power consuming graphical element than the second version of the graphical element for the same surf application. Depending on which version of the graphical element that is in use, the surf application can be categorized as a low power consumption application or a high power consumption application. Accordingly, processing power consumption information for an underlying application, as described herein, may be specific to the processing power consumption of the graphical element of the underlying application.

The power consuming process 204 of FIG. 2 is not limited to power consuming processes of application(s) 206. In other example use cases, the power consuming process 204 may be a non-application process being executed by the processing circuitry 201, a process for operating the display 110 for non-application content, a process for operating communications circuitry for wired and/or wireless communications with one or more other devices, a process for operating a sensor (e.g., an inertial sensor, a light sensor, an acoustic sensor, a motion sensor, or the like) of the electronic device, a process for operating a camera of the electronic device, a process for operating a speaker or a microphone of the electronic device, and/or any other logical or hardware process that consumes power from the battery 200. In the example of FIG. 2, a single power consuming process 204 is shown, however, it is appreciated that multiple or many power consuming process may be performed concurrently by the electronic device 100 at any given time.

As shown in FIG. 2, the memory 202 may also store account information 208 for one or more users of the electronic device 100. In the example of FIG. 2, the account information 208 includes account information for a user account 210 (e.g., "USER 1 ACCOUNT") for a single user of the electronic device 100. In other use cases, the account information may include account information for more than one user account 210. The account information stored for a user account 210 may include a user identifier, one or more user preferences, one or more user privileges, or the like. As shown in FIG. 2, the memory 202 may also store power consumption information 212. The power consumption information 212 may include user power consumption information associated with each user account 210. The power consumption information 212 may also include power consumption information associated with one or more power consuming processes 204, such as one or more of the applications 206 and/or one or more corresponding graphical elements.

Figure 3:
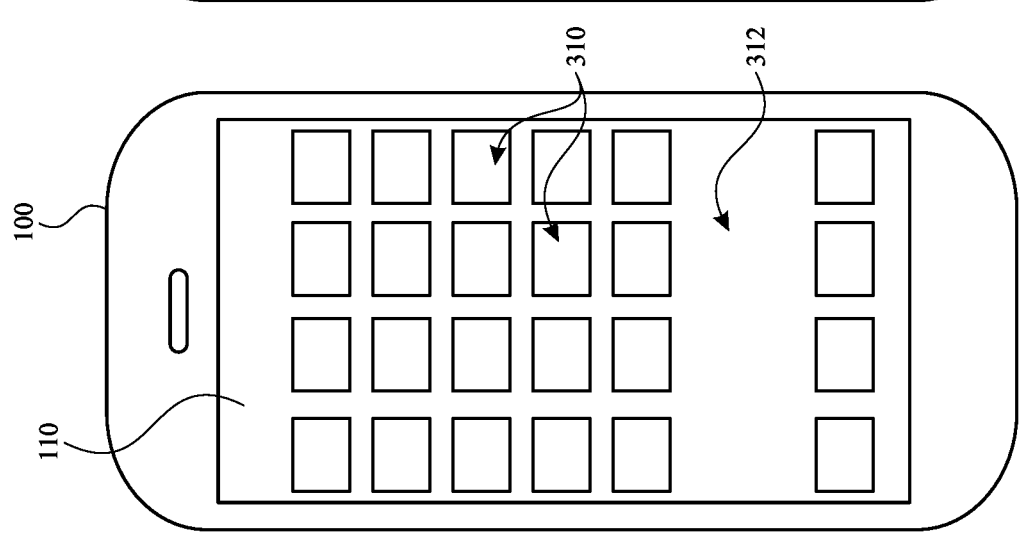
FIG. 3 illustrates an example home screen of an electronic device, in accordance with one or more implementations.

FIG. 3 illustrates an example home screen that may be displayed by the display 110 of the electronic device 100, in accordance with one or more implementations. As shown in FIG. 3, a home screen 312 may include one or more application icons 310. In this example, the application icons 310 are displayed in a grid of application icons. The application icons 310 may be functional icons that display information indicating an underlying one of the applications 206 (also referred to herein as an underlying application 206) and that can be selected for launching the full user interface of the underlying application. In one or more implementations, graphical elements for one or more of the underlying applications 206 can also be displayed on the home screen 312.

Figure 4:
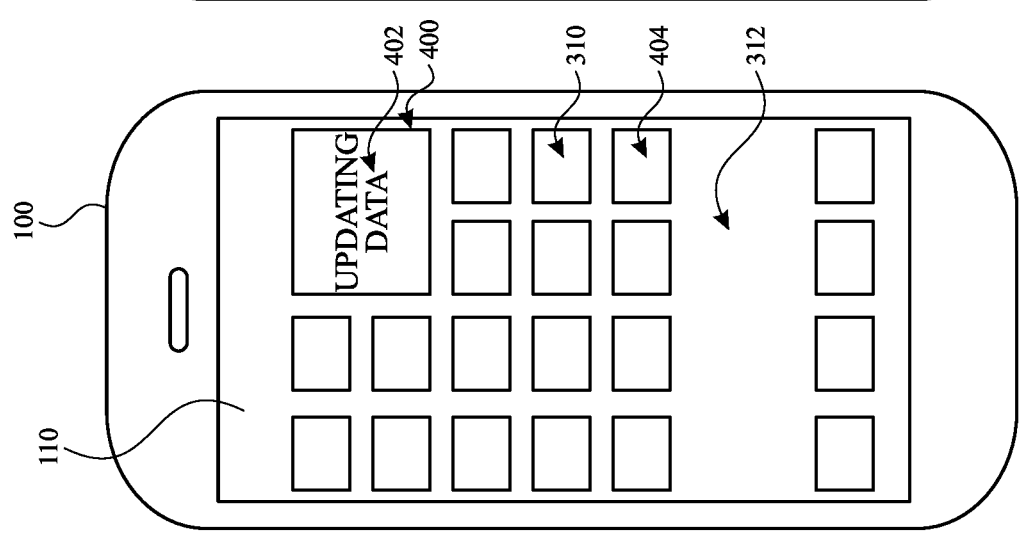
FIG. 4 illustrates an example home screen displaying a graphical element corresponding to an underlying application, in accordance with one or more implementations.

For example FIG. 4 illustrates a use case in which the home screen 312 includes application icons 310 and a graphical element 400, each associated with an underlying application 206. The application icons 310 may be static icons that do not include any dynamic or updating data. In contrast, the graphical element 400 may display updating data 402, such as dynamic content obtained by the underlying application 206 (e.g., by a data extension of the underlying application) for that graphical element, and provided for display by the graphical element 400. For example, when the graphical element 400 is displayed by the display 110 (e.g., on the home screen 312 as in the example of FIG. 3), a set of updates to the updating data 402 that have been previously provided by the underlying application 206 may be displayed by the graphical element 400, such as at times specified in advance by the underlying application 206, and while a full user interface of the underlying application 206 is not displayed on the electronic device 100. The underlying application 206 for the graphical element 400 (e.g., the underlying application 206 itself and/or a data extension of the underlying application 206) may obtain and provide, for display via the graphical element 400, updated application-specific information (e.g., updating data 402) on the electronic device 100 at various times, while the full user interface of the underlying application 206 is not displayed on the electronic device 100. For example, if the full user interface of the underlying application 206 were to be launched (e.g., by selecting the application icon 310 for that underlying application 206 or via interaction with the graphical element 400), the home screen 312 (e.g., including the application icons 310 and the graphical element 400) may be replaced on the display 110 by the full user interface of the underlying application. In one example use case, the home screen 312 may display both an application icon 404 and a graphical element 400 for the same underlying application 206.

In one or more implementations, the graphical element 400 may be a graphical element of a photos application, a weather application, a phone application, a messaging application, a social media application, a calendar application, a news application, a media application, a banking application, a fitness application, a mapping application, or generally any application for which updated data can be updated and displayed periodically, occasionally, or continuously. For example, a graphical element 400 of an underlying photos application may periodically display one or more recent photos that are stored and/or captured by the electronic device, as the updating data 402. As another example, a graphical element 400 of an underlying calendar application may display calendar notifications at times corresponding to events stored by the calendar application, as the updating data 402. As another example, graphical element 400 of a social media application may display notifications and/or excerpts of social media posts of contacts of a user account on a periodic basis and/or when the social media posts are posted by the contact, as the updating data 402. As another example, a graphical element 400 of a weather application may periodically display weather updates as the updating data 402. Accordingly, the updating data 402 can be updated on the display by a system process, and/or updated for upcoming display by the underlying application, with a frequency that varies from application to application and/or from graphical element to graphical element. The amount of communications and/or processing that are performed to generate the updating data can vary from application to application and/or from graphical element to graphical element. Accordingly, applications 206 (e.g., and their corresponding graphical elements 400) can be categorized (e.g., by the electronic device or another device) based on the power consumption of the process(es) for providing the updating data 402 in the corresponding graphical element 400. In one example, an application 206 (e.g., and/or its corresponding graphical element 400) can be categorized as a high power consumption application (e.g., and/or a high power consumption graphical element 400), a medium power consumption application (e.g., and/or a medium power consumption graphical element 400), or a low power consumption application (e.g., and/or a low power consumption graphical element 400), based on the amount of power consumed by the (e.g., application and/or system) process (es) for obtaining and displaying the updating data 402 in the graphical element.

In the example of FIG. 4, the graphical element 400 has a size corresponding approximately to the size of four application icons 310 arranged in a square two-by-two grid, and may thus be referred to as having a two-by-two size. In other use cases, the graphical element 400 may have other sizes, such as a one-by-one size, a two-by-one size, or another size. These sizes are exemplary and any arbitrary size may be supported.

In one or more implementations, the graphical element 400 may be an interactive graphical element. For example, one or more portions of the graphical element 400 may be selectable to cause the electronic device to launch into an expanded graphical element or into a corresponding section of the full user interface of the underlying application 206, when selected (e.g., by a touch input on a particular portion of the graphical element). For example, a user may touch an area of the graphical element 400 of an underlying photos application, to expand the size of a photo displayed at that location and/or to obtain additional photos related to that photo. As another example, a user may touch an area of the graphical element 400 of an underlying social media application with a post from a posting user, to obtain more of that post and/or other posts or information for the posting user. In one or more implementations, interactive regions of the graphical element 400 may be defined in a definition file to access a respective Universal Resource Indicator (URI), which may launch into an associated portion of application of a full UI of the application.

In the example of FIG. 4, a single graphical element 400 is displayed. However, in other use cases, more than one graphical element 400 (corresponding to more than one underlying application 206) can be displayed in the home screen 312. In various implementations, multiple graphical elements 400 (corresponding to multiple underlying applications 206) can be displayed in various visual arrangements, such as a side-by-side arrangement in which one graphical element 400 for one underlying application 206 is displayed to the left or the right of another graphical element 400 for a different underlying application 206, a vertical arrangement in which one graphical element 400 is displayed to the above or below another graphical element 400, or a partially overlapping arrangement in which one graphical element 400 is displayed partially over one or more other graphical elements 400.

Figure 5:
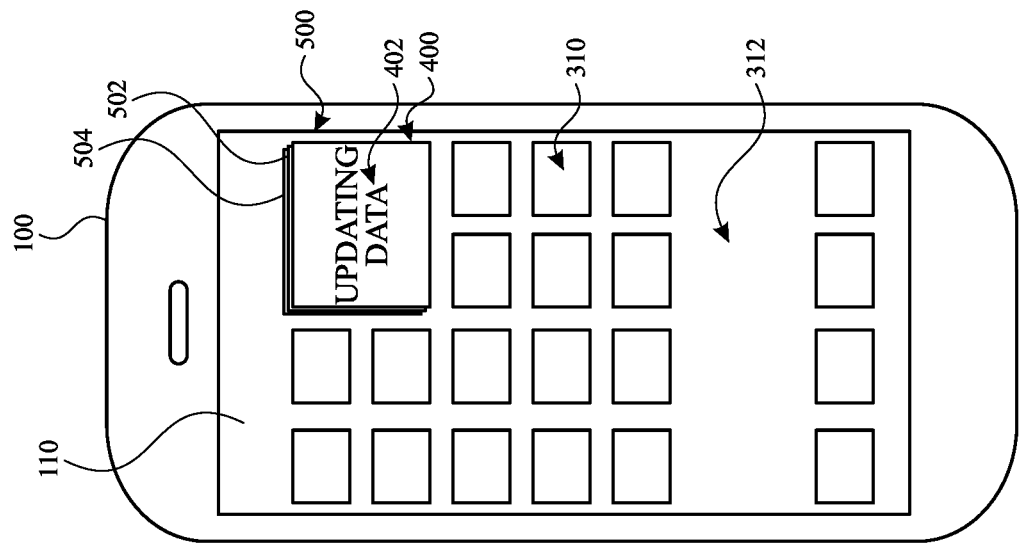
FIG. 5 illustrates an example home screen displaying a visual arrangement of graphical elements each corresponding to an underlying application, in accordance with one or more implementations.

In one or more implementations, multiple graphical elements 400 may be visually arranged in a stack of graphical elements 400. For example, FIG. 5 illustrates an example in which a stack 500 of graphical elements is displayed on the home screen 312. In this example, the stack 500 includes the graphical element 400 of FIG. 4, stacked with a graphical element 502 and a graphical element 504. As shown, a stack of graphical elements may include multiple graphical elements arranged for display at substantially the same position in the home screen 312, and mostly (e.g., more than 90%) overlapping each other. The graphical element 400, the graphical element 502, and the graphical element 504 of the stack 500 may each receive and display updating data 402 from a corresponding underlying application 206. The underlying applications 206 may each be configured to receive and display, via their respective graphical element, updated application-specific information (e.g., the updating data 402) on the electronic device 100 while a full user interface of each underlying application 206 is not displayed on the electronic device 100.

As shown, the stack 500 may include multiple graphical elements having a common size (e.g., two-by-two in this example). A user of the electronic device 100 may change the top-most displayed graphical element in the stack 500 by, for example, providing a swipe up or swipe down gesture, which may trigger an animation that flips through the different graphical elements of the stack 500. In the example of FIG. 5, a single stack 500 is displayed in the home screen 312. However, in other implementations, multiple stacks 500 may be displayed at multiple locations in the home screen 312.

Figure 6:
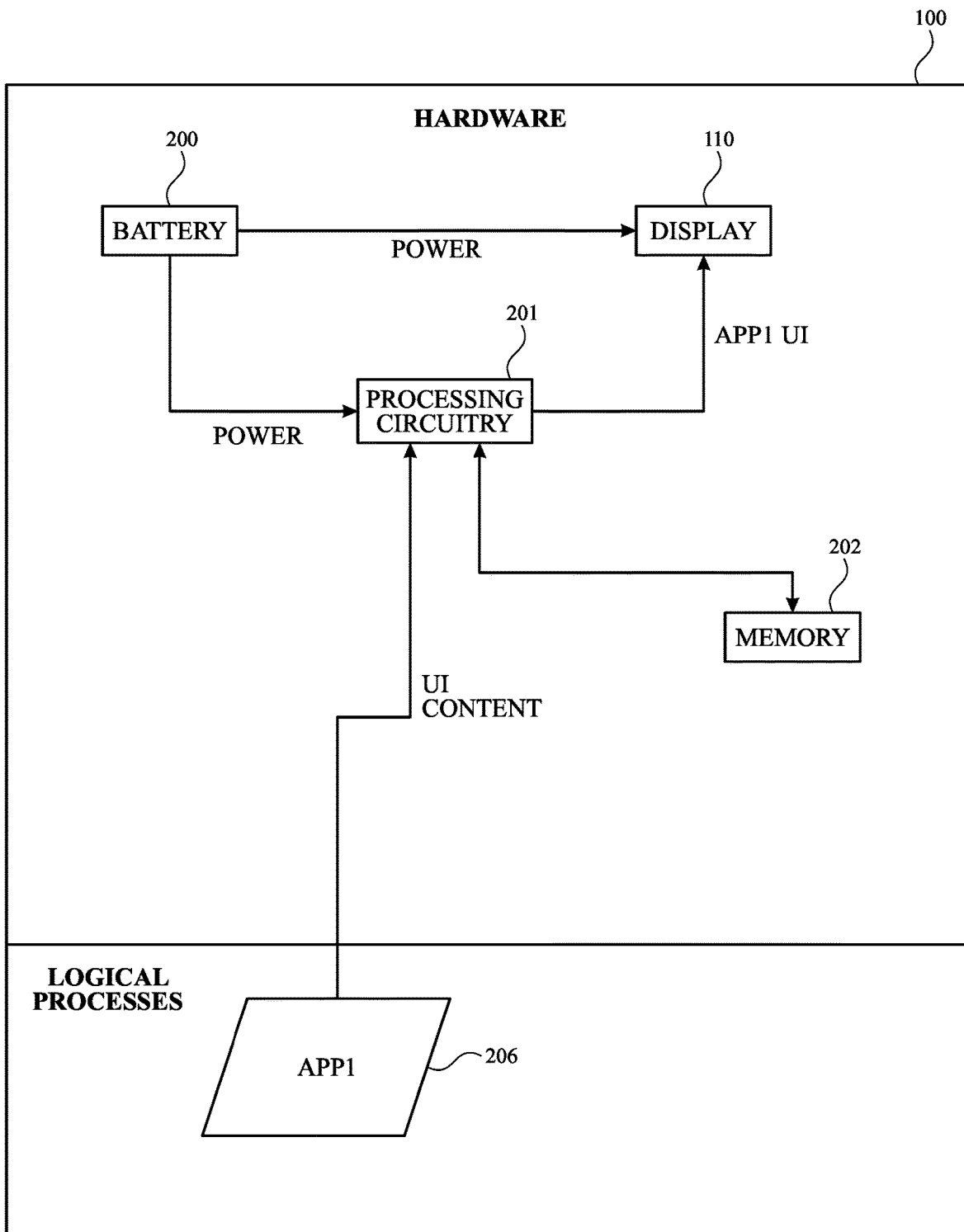
FIG. 6 illustrates an example architecture of an electronic device displaying a full user interface of an application, in accordance with one or more implementations.

FIG. 6 illustrates an example in which the architecture of FIG. 2 operates to display a full user interface (UI) of an application 206, in accordance with one or more implementations of the subject technology. In this example, an application 206 (e.g., APP1) that is being executed (e.g., from memory 202) by the processing circuitry 201 provides UI content for display. In this example, the processing circuitry 201 (e.g., by executing instructions from the application 206 and/or one or more system processes of the electronic device 100) renders the full UI (e.g., "APP 1 UI") for display by the display 110. In this example, the APP1 UI may be displayed over substantially the entire active display area of the display 110. However it is also appreciated that some system content may be displayed along with the APP1 UI, such as a time, a battery indicator, and/or a signal strength indicator (as examples). In this example, the APP1 UI provides access to all of the functions and/or information of the underlying application 206 (e.g., APP1).

Figure 7:
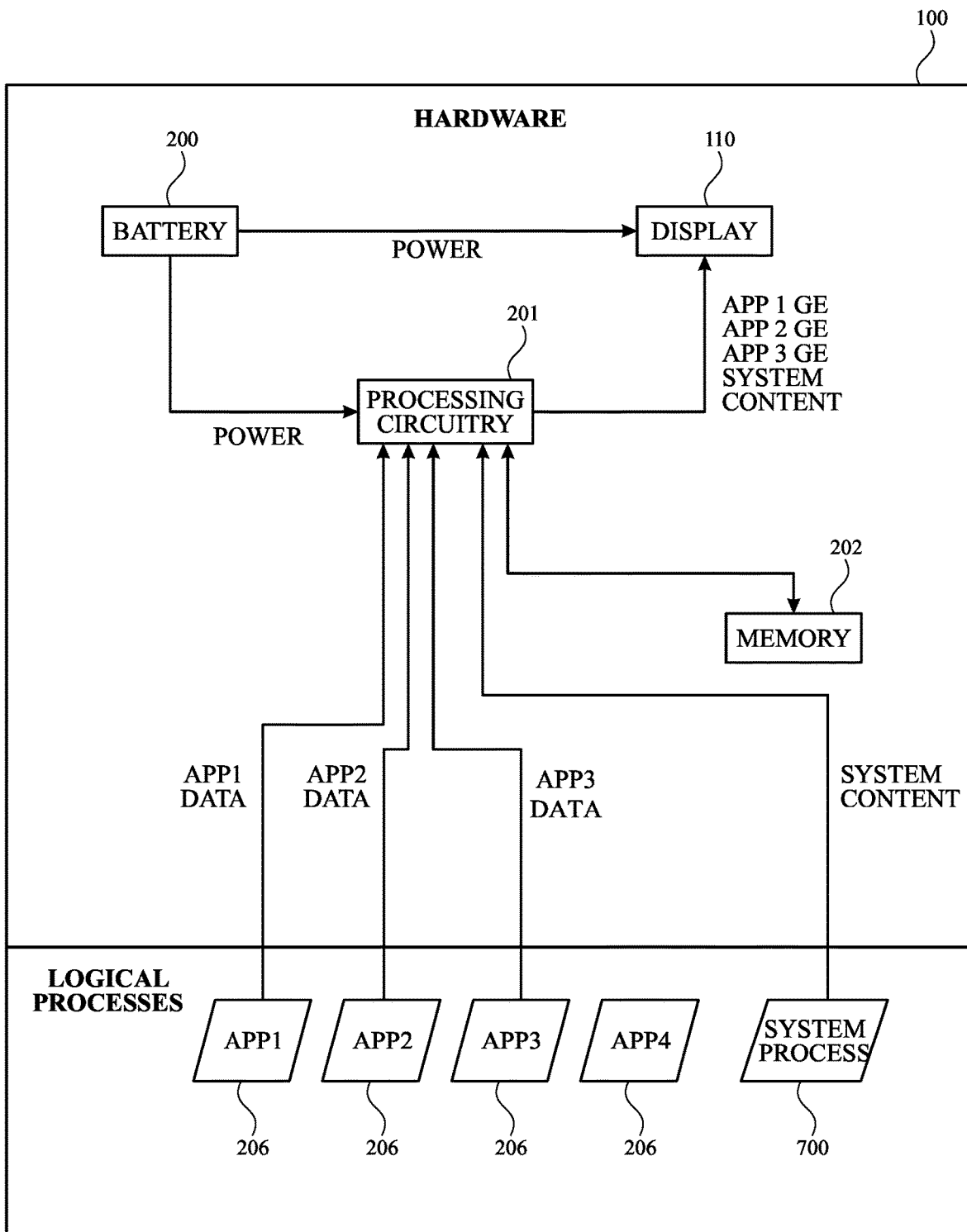
FIG. 7 illustrates an example architecture of an electronic device displaying a visual arrangement of graphical elements each corresponding to an underlying application, in accordance with one or more implementations.

In contrast with the example of FIG. 6, in which only the APP1 UI is provided for display by the display 110, FIG. 7 illustrates an example in which the architecture of FIG. 2 operates to display the home screen 312 and the stack 500 of graphical elements of FIG. 5. As shown, when the home screen 312 is displayed, one or more system processes, such as system process 700 may provide system content, such as the icons 301, a background image, and/or information for displaying a time, a date, a battery indicator, a signal strength indicator, and/or any other system content for inclusion in the home screen 312. In this example, three applications 206 (e.g., APP1, APP2, and APP3) each also provide (e.g., using a corresponding data extension for that application) corresponding application data (e.g., APP1 DATA, APP2 DATA, and APP3 data, respectively) for display in a corresponding graphical element for that application. As shown, the processing circuitry 201 (e.g., by executing instructions from the application and/or one or more system processes such as system rendering process), may render the home screen including the system content provided by the system process 700, and three graphical elements (e.g., APP1 GE, APP2 GE, and APP3 GE) for display in a visual arrangement such as in the stack 500 of FIG. 5. As an example, the APP1 GE may correspond to the graphical element 400 of FIG. 5, the APP2 GE may correspond to the graphical element 502 of FIG. 5, and the APP3 GE may correspond to the graphical element 504 of FIG. 5.

In one or more implementations, the electronic device 100 may determine which graphical elements are included in the stack 500, a number of graphical elements that are included in the stack 500, and/or an order of the graphical elements that are included in the stack 500 based on power consumption information 212. The power consumption information 212 may include user power consumption information for a user account, and may include processing power consumption information for one or more graphical elements and/or their respective underlying applications. The processing power consumption information for a graphical element may quantify and/or categorize the power consumed by the underlying application and/or system processes for obtaining, generating, and/or displaying the graphical element. In one or more implementations, the processing power consumption information may include a categorization of graphical elements themselves in power consumption categories, and/or a categorization of the underlying applications (e.g., according to the power consumption of their respective graphical elements). For example, the electronic device 100 may determine a subset of the underlying applications 206 for which graphical elements are to be included in the stack 500, based at least in part on the user power consumption information and the processing power consumption information. In one or more implementations, the electronic device may also determine which graphical elements are included in the stack 500, a number of graphical elements that are included in the stack 500, and/or an order of the graphical elements that are included in the stack 500 based on user activity information.

Figure 8:
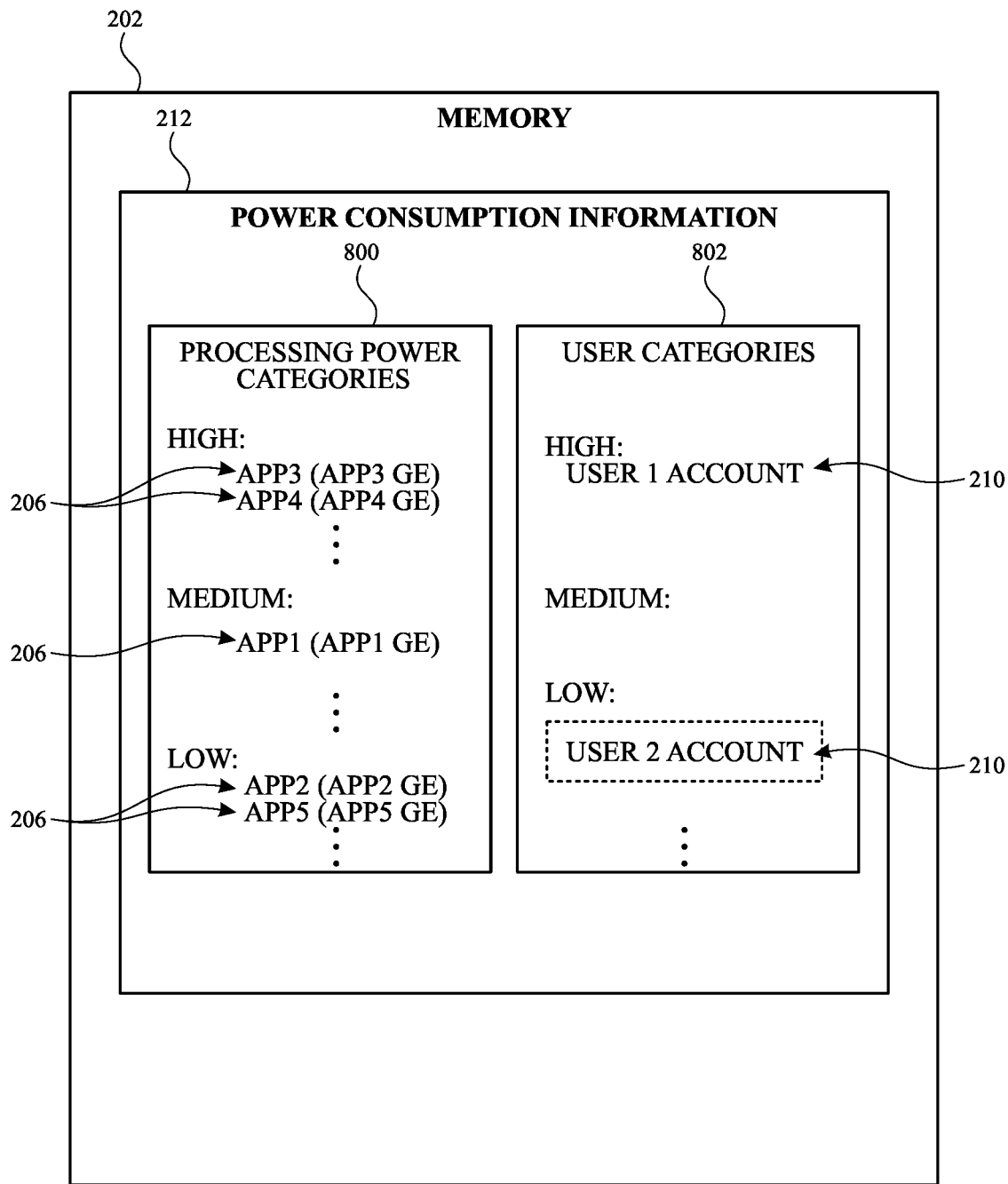
FIG. 8 illustrates an example of power consumption information, in accordance with one or more implementations.

FIG. 8 illustrates an example of power consumption information 212 that may be obtained, generated, and/or stored by an electronic device, such as the electronic device 100. In the example of FIG. 8, the power consumption information 212 is stored in memory 202. However, the power consumption information may, in various implementations, be predetermined (e.g., determined in advance by the electronic device 100 or another device or system, and prestored in the memory 202 as in the example of FIG. 8), or may be determined in real-time during operation of the electronic device 100 (e.g., including during a process for determining a subset of the underlying applications 206 for which graphical elements are to be included in a stack 500 or other visual arrangement). In various implementations, the power consumption information may be static information that is determined once and stored (e.g., in the memory 202 or other memory accessibly by the electronic device) or may be dynamic information that is updated periodically, occasionally, or continuously throughout operations of the electronic device 100.

In the example of FIG. 8, the power consumption information 212 includes processing power categories 800 and user categories 802 that categorize the power consumption of graphical elements/applications and users, respectively, of the electronic device 100. In this example, the processing power consumption of various graphical elements is characterized (e.g., based on the power consumed by the underlying applications for obtaining and/or generating data, and the power consumed by system processes and/or the display 110 for rendering and displaying the data in the graphical element) by including the applications 206 that underlie each graphical element in high, medium, and low processing power consumption categories. In this example, the user power consumption of users of the electronic device is characterized by including user accounts 210 in high, medium, and low user power consumption categories. However, it is appreciated that the power consumption of graphical elements/applications and/or the power consumption of users of the electronic device 100 can be characterized by more of fewer categories than are illustrated in FIG. 8, and/or by other metrics such as a power consumption rate, a power consumption score, or other power consumption metrics. In one or more implementations, the processing power consumption of various graphical elements can be characterized by including the graphical elements themselves in high, medium, low and/or other power consumption categories, and/or by determining other metrics such as a power consumption rate, a power consumption score, or other power consumption metric for each graphical element.

In the example of FIG. 8, the electronic device 100 has determined, based on the processing power consumption for operating five graphical elements (e.g., APP1 GE, APP2 GE, APP3 GE, APP4 GE, and APP5 GE) corresponding to five underlying applications 206 (e.g., APP1, APP2, APP3, APP4, and APP5), that two of the five graphical elements (e.g., APP3 GE and APP4 GE) and, resultingly, their corresponding underlying applications (e.g., APP3 and APP4) are in a high processing power consumption category, that one of the five graphical elements (e.g., APP1 GE) and, resultingly, its corresponding underlying application (e.g., APP1) is in a medium processing power consumption category, and that two of the five graphical elements (e.g., APP2 GE and APP5 GE) and, resultingly, their corresponding underlying applications (e.g., APP2 and APP5) are in a low processing power consumption category. The processing power consumption information for each graphical element and/or its underlying application 206 may be based on an update frequency with which that underlying application 206 obtains and provides the updated application-specific information (e.g., updating data 402) for display with its respective graphical element, based on an update frequency with which a system process updates the updated application-specific information within the graphical element on the display, and/or based on a power consumption value associated with a single instance of obtaining the updated application-specific information. For example, the update frequency with which data is obtained and/or the update frequency with which updated data is displayed may be relatively higher for an application that displays sports scores, stock updates, or social media posts that are rapidly changing (e.g., on time scales of seconds or minutes) and/or can change at any time, than for a weather application that displays weather information that may only be updated once each day or once each hour. More frequent updates to the displayed information in the graphical element and/or more frequent updates to the for display data can use more power over a given period of time than less frequent updates.

The categorization of the graphical elements and the applications 206 underlying each graphical element in the processing power categories 800 as in the example of FIG. 8 may be based on the processing power consumption by the application 206 (e.g., and/or a data extension thereof) to obtain and provide updated data for the corresponding graphical element for that application, and the processing power consumption of one or more system processes that render and display the updated data in the graphical element, and may be unrelated to other power consumption by the application (e.g., power consumption by the application when the full UI of the application is in use on the electronic device).

A power consumption value associated with a single instance of obtaining the updated application-specific information may be relatively higher for applications with graphical elements for which data is obtained from a remote device or system (e.g., consuming power to send and receive wired or wireless communications with the remote device or system, such as by a social media application that displays social media posts in the graphical element) and/or includes rich content, than for applications with graphical elements for which data is obtained locally on the electronic device 100 (e.g., for a photos application that displays photo information for photos stored at the electronic device or for a calendar application that displays event information for events in an on-device calendar at the electronic device) and/or that includes static content. The power consumption value and/or the update frequency for a particular graphical element and/or underlying application 206 may be determined based on the power consumption values and/or update frequencies of applications and/or graphical elements on a device of a typical (e.g., average) user, or may be measured and/or modified for a specific user account of the electronic device 100. For example, the update frequency for a graphical element of a social media application may be a number of average updates per hour, per day, etc. by an average user of a graphical element of the social media application, or may be a measured number of updates per hour, per day, etc. by the locally displayed graphical element of a locally installed instance of the social media application on the electronic device 100.

In the example of FIG. 8, the user account 210 (e.g., USER 1 ACCOUNT) has been determined to be in a high user power consumption category. For example, the electronic device 100 may determine that the user account 210 is in the high user power consumption category based on user power consumption information obtained by the device (e.g., by the processing circuitry 201 based on monitoring a charge level of the battery 200). As an example, the user power consumption information may include a frequency (e.g., a per-day frequency, a per-week frequency, a per-month frequency, etc.) with which the electronic device 100 consumes a predefined fraction of a full battery charge of the battery 200. As examples, the predefined fraction may be ninety percent, eighty percent, fifty percent, or another predefined percentage or fraction of a full battery charge.

In one illustrative example, a user account 210 may be determined to be in a high user power consumption category if the electronic device 100 consumes more than approximately ninety percent of the full battery charge of the battery 200 at least once per day (e.g., per twenty four hours), a medium user power consumption category if the electronic device 100 consumes more than fifty percent of the full battery charge of the battery 200 at least once per day, and a low user power consumption category if the electronic device 100 consumes more than fifty percent of the full battery charge of the battery 200 less than once per day (e.g., as measured by the processing circuitry 201 over the course of several days, such as over the course of a week, a month, or another number of days). Because a user can also charge the battery 200 during a day, the fraction of a full battery charge that is consumed in a day may be an accumulated total charge consumption that can exceed one hundred percent in some implementations (e.g., and a user account may be categorized as a high power consumption user account due to an accumulated use of more than ninety percent of a full battery charge even if the battery itself never or rarely reaches a charge level of less than ten percent). In other implementations, the fraction of the full battery charge that is consumed can be a measured charge level of the battery that corresponds to the lowest charge on the battery in a given day (e.g., if the electronic device 100 consumes large amounts of power in a day but is nearly always charging the battery so that the charge on the battery never falls below ninety percent in a day, the user account 210 may be categorized as a low power consumption user). The example of FIG. 8 also illustrates how an electronic device may have multiple users with multiple respective user accounts 210 (e.g., including a second user account labeled "USER 2 ACCOUNT") in some implementations. As shown in the example of FIG. 2, the user accounts 210 may be determined to be in different user power consumption categories (e.g., an optional USER 2 ACCOUNT may be in a low user power consumption category as in FIG. 8).

Figure 9:
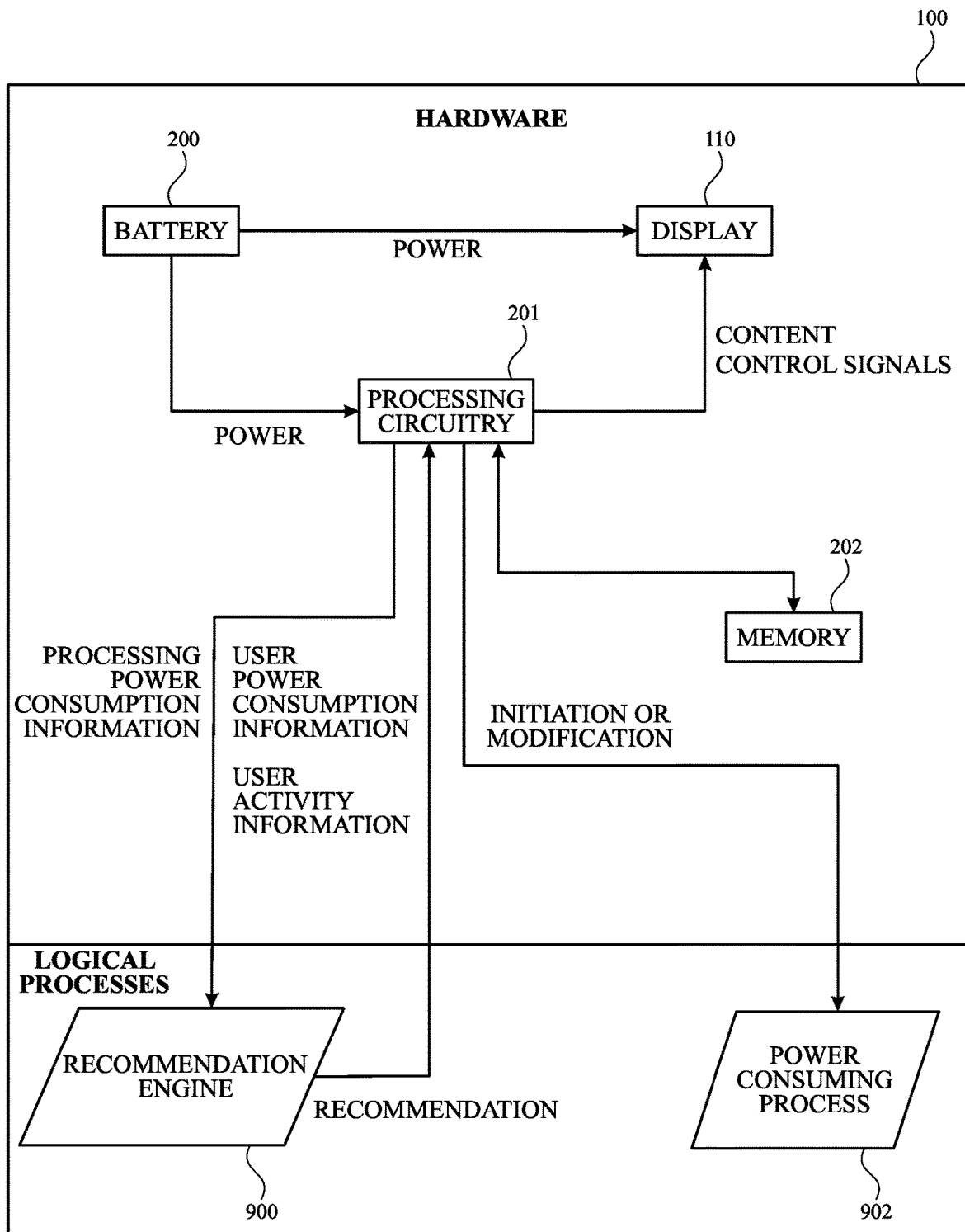
FIG. 9 illustrates an example architecture of an electronic device generating a recommendation for initiation or modification of a power consuming process, in accordance with one or more implementations.

In one or more implementations, the electronic device 100 may determine a subset of the applications 206 that are installed on the electronic device, for which graphical elements are to be included in a visual arrangement (e.g., a stack 500) of graphical elements. For example, FIG. 9 illustrates an example in which the architecture of FIG. 2 operates to initiate or modify a power consuming process at the electronic device. For example, in one or more implementations, a power consuming process 902 at the electronic device 100 may correspond to display of a visual arrangement (e.g., a stack 500) of graphical elements, and the figure illustrates how the electronic device 100 may generate and display a visual arrangement (e.g., a stack 500) of graphical elements that correspond to a subset of the applications 206 that are installed on the electronic device 100.

In the example of FIG. 9, a recommendation engine 900 (e.g., executed by the processing circuitry 201) may receive user activity information for one or more user accounts 210, user power consumption information for one or more user accounts 210, and processing power consumption information for one or more graphical elements and/or one or more underlying application 206 of one or more graphical elements. The recommendation engine 900 may determine, based on the user activity information, a candidate subset of the applications 206 that are installed on the device, the candidate subset including a first subset of the applications 206.

For example, determining a candidate subset of applications 206 based on user activity information may include selecting applications 206 that are most frequently used by the user account 210 and/or most relevant to the user account 210 (e.g., as determined using a machine-learning engine trained to identify applications that are relevant to a user account based on user activity). For example, if the user frequently accesses a social media application, frequently accesses a web page associated with a social media application, and/or frequently mentions the social media application in messages or other communications, documents, or other content on the electronic device 100, this user activity may indicate to the recommendation engine 900 that the social media application is a relevant application to the user and their associated user account 210 (e.g., more relevant than another application such as a news application). In this example, the recommendation engine 900 may include the social media application in the candidate subset of the applications. In one or more implementations, one or more applications 206 (e.g., a photos application, a calendar application, etc.) may be included in the candidate subset irrespective of the user activity information.

In one or more implementations, the recommendation engine 900 may then generate a recommendation to add, remove, and/or replace one or more applications 206 from the candidate subset, based on the user power consumption information and/or the processing power consumption information. Recommendations that are generated by the recommendation engine 900 can be automatically implemented (e.g., initiated or modified by the processing circuitry 201 without user interaction) or may be implemented (e.g., initiated or modified) responsive to receiving a user approval of the recommendation, in various implementations.

In one or more implementations, the processing circuitry 201 may remove at least one of the first subset of the underlying applications from the candidate subset based on the user power consumption information and the processing power consumption information. In one or more implementations, removing at least one of the first subset of the underlying applications from the candidate subset may include determining (e.g., by the recommendation engine 900), based on the user power consumption information, that the user account is in a high user power consumption category, and determining (e.g., by the recommendation engine 900), based on the processing power consumption information, that one of the first subset of the underlying applications is a high power consumption underlying application (e.g., an application 206 that is categorized, along with its corresponding graphical element, in a high power consumption category as described in connection with FIG. 8). In this example, the processing circuitry 201 may replace the one of the first subset of the underlying applications with a low power consumption one of the underlying applications 206 (e.g., an application 206 that is categorized, along with its corresponding graphical element, in a low power consumption category as described in connection with FIG. 8).

In one or more implementations, removing one of the first subset of the underlying applications may include determining (e.g., by the recommendation engine 900), based on the user power consumption information, that the user account is in a low user power consumption category, and determining (e.g., by the recommendation engine 900), based on the processing power consumption information, that the one of the first subset of the underlying applications is a low power consumption underlying application (e.g., an application 206 that is categorized, along with its corresponding graphical element, in a low power consumption category as described in connection with FIG. 8). In this example, the processing circuitry 201 may replace, in the candidate subset, the one of the first subset of the underlying applications with a high power consumption underlying application. In this way, the electronic device 100 can create visual arrangements of graphical elements that are of interest and/or relevance to the user of the electronic device, while avoiding generating and displaying visual arrangements that use undesirably high amounts of power from the battery 200.

In one or more implementations, the recommendation engine 900 may determine a subset of the underlying applications 206 for which to include corresponding graphical elements in a visual arrangement of graphical elements based on an overall power consumption of the visual arrangement (e.g., in addition to and/or in place of the power consumption of individual ones of the applications). For example, the recommendation engine 900 may determine the subset of the underlying applications, in part, by determining a candidate subset including a first subset of the underlying applications. The recommendation engine 900 may then determine, based on the user power consumption information, that the user account is in a high power consumption category. The recommendation engine 900 may then determine, based on the processing power consumption information, that an overall power consumption of the first subset of the underlying applications (e.g., based on a total update frequency and/or a total power consumption rate of the graphical elements of the first subset) exceeds a threshold that corresponds to the high power consumption category; and modify the first subset of the underlying applications based the overall power consumption exceeding the threshold. For example, a threshold for the overall power consumption of a visual arrangement of graphical elements corresponding to a subset of the underlying applications 206 may be predetermined for each of one or more power consuming processes 902, and for each user power consumption category. For example, a stack 500 of graphical elements may have a higher overall power consumption threshold if the user of the electronic device is a low power consumption user than if the user is a high power consumption user. In this example, a higher number of graphical elements can be included in a stack and/or higher power consuming graphical elements can be included in the stack, than in a case in which the user is a high power consumption user.

In this example of generating a visual arrangement, the processing circuitry 201 may initiate the power consuming process 902 (e.g., by identifying the graphical elements to be included in the stack 500 and displaying the stack 500 where the stack 500 has not been previously displayed by the electronic device 100) based on the recommendation from the recommendation engine 900. However, in other implementations, the processing circuitry 201 may modify an existing power consuming process 902 based on the recommendation from the recommendation engine 900.

Figure 10:
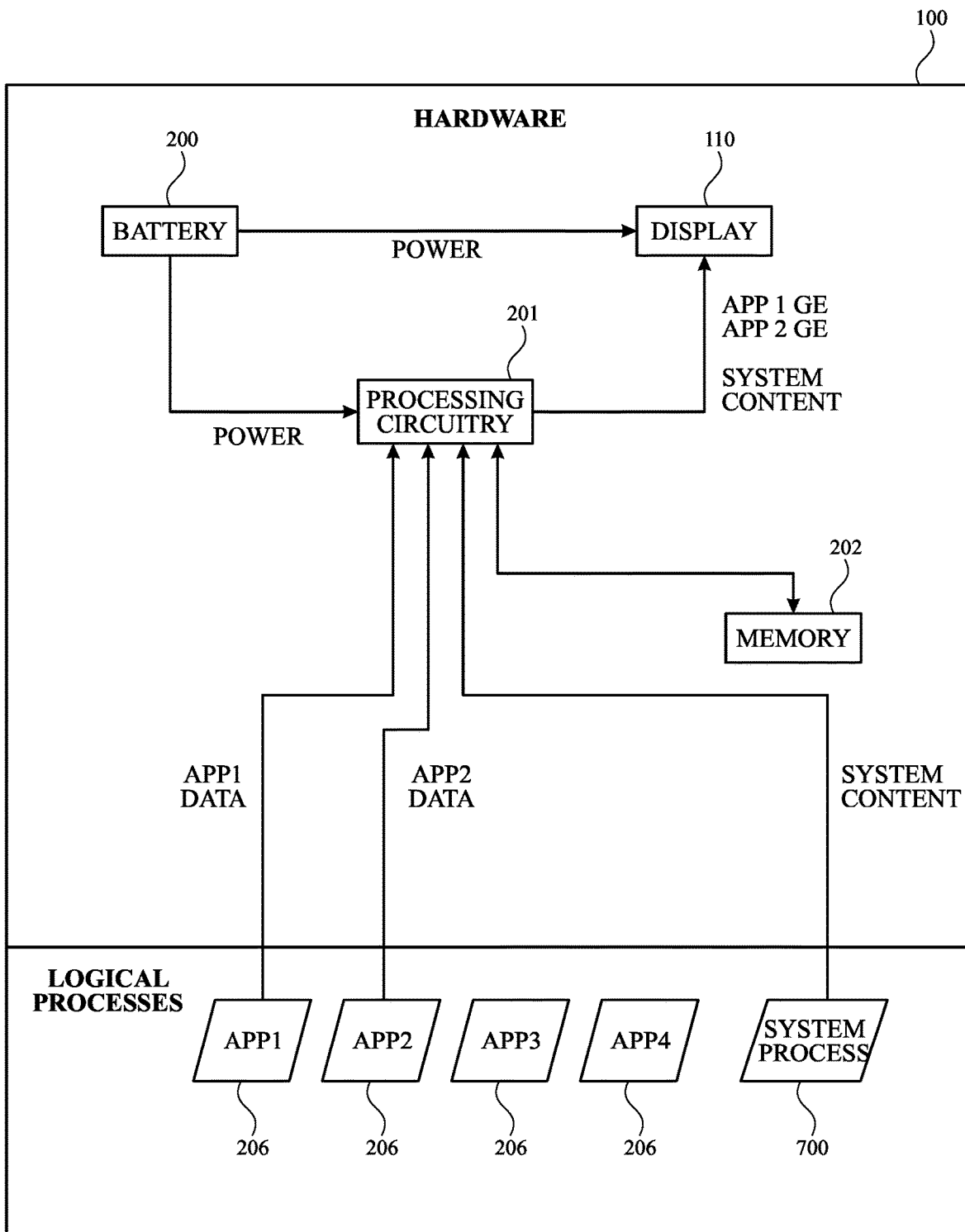
FIG. 10 illustrates an example architecture of an electronic device displaying a modified visual arrangement of graphical elements each corresponding to an underlying application, in accordance with one or more implementations.

For example, FIG. 10 illustrates an example in which the processing circuitry 201 modifies an existing power consuming process 902, by modifying an existing visual arrangement (e.g., stack 500) of graphical elements (e.g., the existing visual arrangement described above in connection with FIG. 7). For example, after a visual arrangement (e.g., a stack 500) including the graphical element 400 (APP1 GE), the graphical element 502 (APP2 GE), and the graphical element 504 (APP3 GE) of FIGS. 4 and 7 has been displayed, the recommendation engine 900 of FIG. 9 may receive updated user power consumption information for a user account 210. Based on the updated user power consumption information, the recommendation engine 900 may determine that the user account 210 has changed from being in a low user power consumption category to now being in a high user power consumption category (in one example). This can occur, for example, if the user changes jobs and has more time to use the electronic device 100 in a day, and/or is no longer able to charge the battery 200 as frequently. Based on determining that the user account 210 has moved to a high user power consumption category, the recommendation engine 900 may recommend that the graphical element (e.g., APP3 GE) of high processing power consumption application (e.g., APP3) be removed from the visual arrangement of graphical arrangements. In this example, the processing circuitry 201 may modify the power consuming process 902 (e.g., the stack 500) to remove the graphical element (e.g., APP3 GE) for APP3 (e.g., from the stack 500 including the graphical element 400 (APP1 GE), the graphical element 502 (APP2 GE), and the graphical element 504 (APP3 GE), as can be seen by comparing FIG. 10 to FIG. 7).

In this illustrative example, a high power consuming graphical element is identified and removed from a stack 500. In other examples, a desired amount of a reduction in power consumption of the entire stack 500 may be determined (e.g., based on a detected corresponding increase in user power consumption), and the graphical element with the nearest amount of power consumption to the desired reduction can be removed from the stack 500. In this example, the graphical element that is removed may be a high power consumption graphical element, a medium power consumption graphical element, or a low power consumption graphical element. In one or more implementations, another graphical element may also be identified to replace the removed graphical element in the stack 500 (e.g., in a case in which the difference in power consumption between the removed graphical element and the replacement graphical element is approximately the desired amount of the reduction in power consumption for the stack).

FIG. 10 illustrates an example, in which the power consuming process 902 of FIG. 9 that is modified is a visual arrangement of graphical elements. However, in other use cases, the power consuming process 902 of FIG. 9 may be another process, such as a process for operating the display 110, a process for operating a sensor (e.g., an inertial sensor or a light sensor or a touch sensor), a process for operating a camera, a process for operating a microphone or a speaker, a communications process or any other process that consumes power from the battery 200. In these implementations, the recommendation engine 900 may recommend modifications to the power consuming process 902 to increase or decrease the power consumption of that process based on whether the user account 210 is in and/or has changed to a high, medium, or low power consumption category. For example, the recommendation engine 900 may determine that the user account is in a high user power consumption category and output a recommendation to reduce a resolution and/or a frame rate of the display 110. In another example, the recommendation engine 900 may determine that the user account is in a low user power consumption category and output a recommendation to increase a resolution and/or a frame rate of the display 110. These recommended increases or decreases can be implemented with or without user approval of the recommendation, in various implementations.

Figure 11:
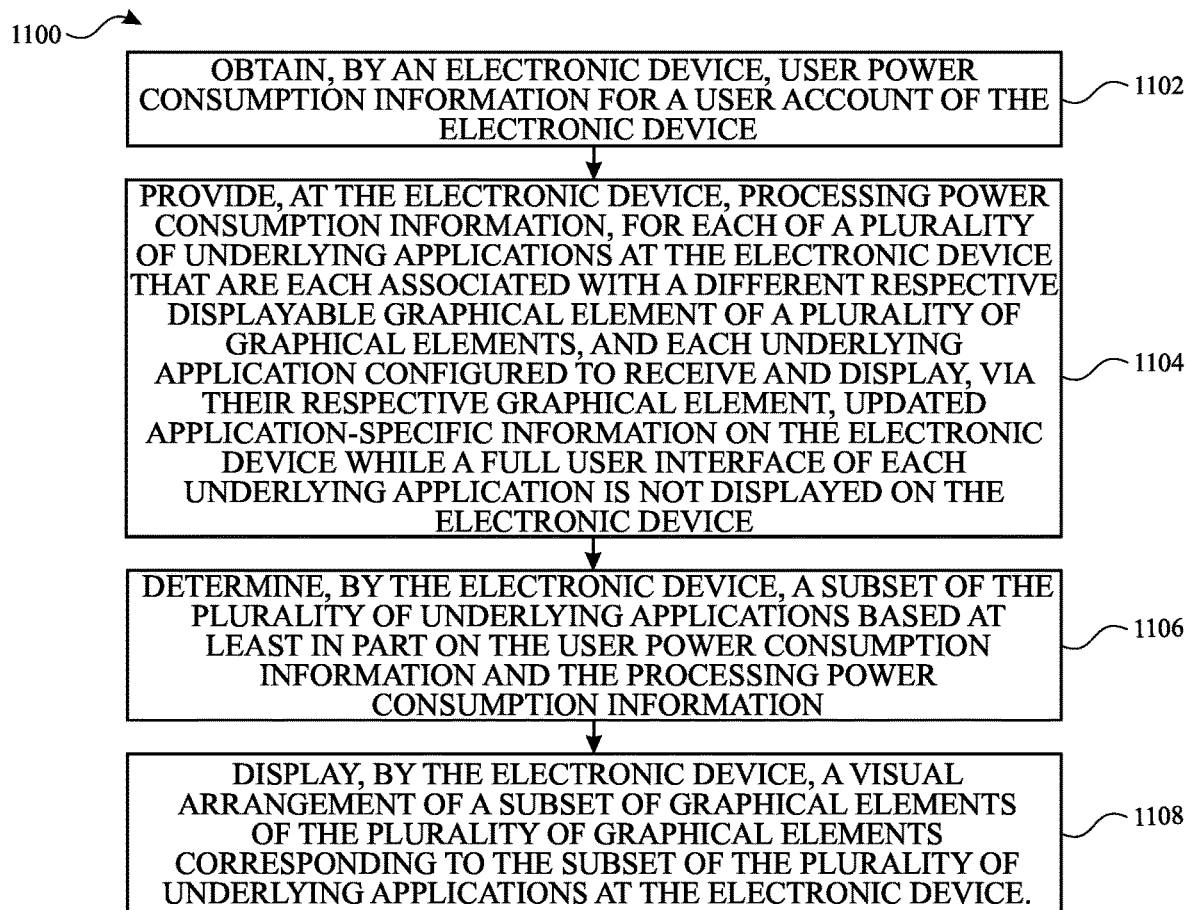
FIG. 11 illustrates a flow diagram of an example process for providing a visual arrangement of graphical elements according to aspects of the subject technology.

FIG. 11 illustrates a flow diagram of an example process for providing a visual arrangement of graphical elements according to aspects of the subject technology. The blocks of process 1100 are described herein as occurring in serial, or linearly. However, multiple blocks of process 1100 may occur in parallel. In addition, the blocks of process 1100 need not be performed in the order shown and/or one or more blocks of process 1100 need not be performed and/or can be replaced by other operations.

In the example of FIG. 11, at block 1102, an electronic device (e.g., electronic device 100) may obtain user power consumption information for a user account (e.g., user account 210) of the electronic device. For example, the user power consumption information may include a frequency with which the electronic device consumes a predefined fraction of a full battery charge of a battery (e.g., battery 200) of the electronic device or a frequency with which the charge of the battery falls below a charge threshold.

At block 1104, the electronic device may provide, at the electronic device, processing power consumption information, for each of a plurality of underlying applications (e.g., applications 206) at the electronic device that are each associated with a different respective displayable graphical element (e.g., graphical element 400, graphical element 502, and/or graphical element 504) of a plurality of graphical elements. Each underlying application may be configured to receive and display, via their respective graphical element, updated application-specific information (e.g., updating data 402) on the electronic device (e.g., on the display 110) while a full user interface of each underlying application is not displayed on the electronic device. For example, an underlying application (e.g., an application 206) may receive updated information locally from memory on the device or from a remote device or server, generate the updated application-specific information for display in the graphical element, and provide the updated application-specific information to a system process with instructions for how and when to display the updated application-specific information in the graphical element. In one or more implementations, the system process may then render and display the updated application-specific information in the graphical element according to the instructions.

The processing power consumption information may be predetermined, or may be determined in real-time (e.g., during determination of the subset of the graphical elements). The processing power consumption information may be static information or dynamic information. For example, the processing power consumption information for each underlying application may be based on one or more of an update frequency with which that underlying application obtains and provides the updated application-specific information for display with its respective graphical element, an update frequency with which the updated information is displayed in the graphical element (e.g., by a system process separate from the application), and/or a power consumption value (e.g., an amount of power consumption) associated with a single instance of obtaining the updated application-specific information.

At block 1106, the electronic device (e.g., recommendation engine 900) may determine a subset of the plurality of underlying applications based at least in part on the user power consumption information and the processing power consumption information.

In one or more implementations, determining the subset of the plurality of underlying applications may include determining the subset based at least in part on the user power consumption information, the processing power consumption information, and user activity information associated with one or more of the underlying applications (e.g., as described above in connection with FIG. 9). In one or more implementations, determining the subset of the plurality of underlying applications may include determining, based on the user activity information, a candidate subset of the plurality of underlying applications, the candidate subset including a first subset of the underlying applications.

In one or more implementations, determining the subset of the plurality of underlying applications may also include removing at least one of the first subset of the underlying applications from the candidate subset based on the user power consumption information and the processing power consumption information for the at least one of the first subset of the underlying applications. For example, removing the at least one of the first subset of the underlying applications from the candidate subset may include determining, based on the user power consumption information, that the user account is in a high power consumption category, and determining, based on the processing power consumption information, that the at least one of the first subset of the underlying applications is a high power consumption underlying application (e.g., an application 206 that is categorized, along with its corresponding graphical element, in a high power consumption category as described in connection with FIG. 8). In one or more implementations, the electronic device may also replace the at least one of the first subset of the underlying applications with a low power consumption one of the underlying applications (e.g., an application 206 that is categorized, along with its corresponding graphical element, in a low power consumption category as described in connection with FIG. 8).

As another example, removing the at least one of the first subset of the underlying applications may include determining, based on the user power consumption information, that the user account is in a low power consumption category, and determining, based on the processing power consumption information, that the at least one of the first subset of the underlying applications is a low power consumption underlying application. In this example, the electronic device may also replace, in the candidate subset, the at least one of the first subset of the underlying applications with a high power consumption underlying application.

In one or more implementations, determining the subset of the plurality of underlying applications at block 1106 may be based on an overall power consumption of the subset. For example, the electronic device 100 (e.g., recommendation engine 900) may determine a candidate subset including a first subset of the underlying applications; determine, based on the user power consumption information, that the user account is in a high power consumption category; determine, based on the processing power consumption information, that an overall power consumption of the first subset of the underlying applications exceeds a threshold that corresponds to the high power consumption category; and modify the first subset of the underlying applications based the overall power consumption exceeding the threshold. For example, the electronic device 100 may remove and/or replace a high power consuming underlying application, in the subset, with a relatively lower power consuming underlying application.

At block 1108, the electronic device may display a visual arrangement (e.g., a stack 500) of a subset of graphical elements of the plurality of graphical elements corresponding to the subset of the plurality of underlying applications at the electronic device (e.g., as shown in FIG. 4, and/or as described in connection with FIGS. 7 and 10).

In one or more implementations, the electronic device may also, while the visual arrangement of the subset of the graphical elements is displayed by the electronic device, obtain updated user power consumption information for the user account, and modify the subset of the graphical elements (e.g., and the subset of the underlying applications for those graphical elements) based on the updated user power consumption information (e.g., as described above in connection with FIGS. 9 and 10).

Figure 12:
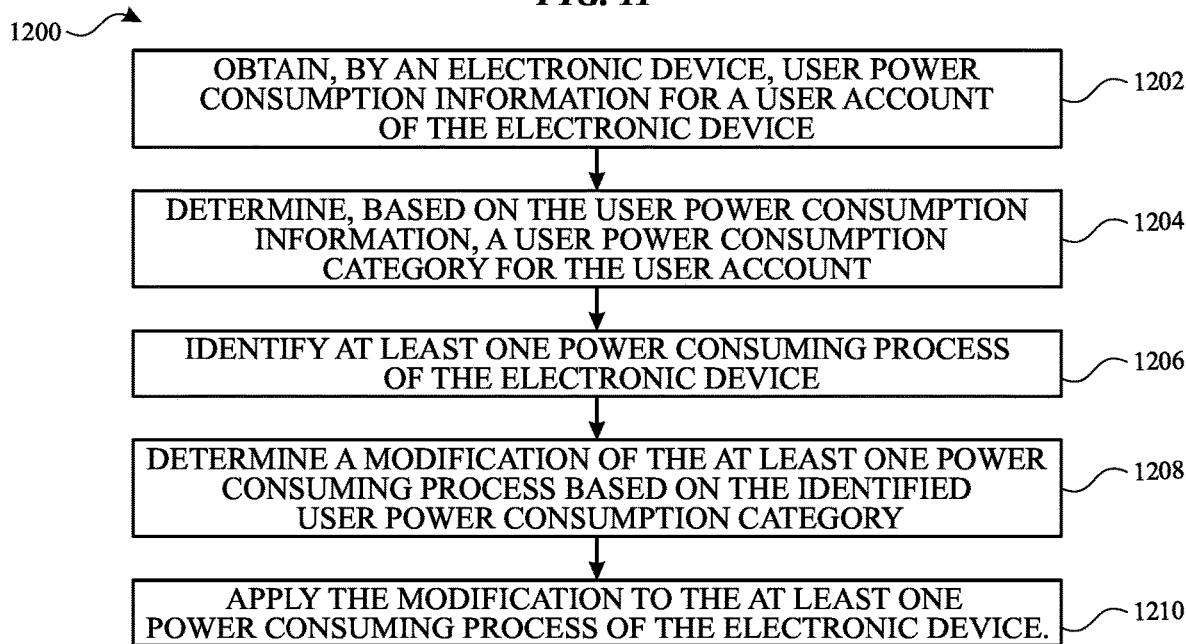
FIG. 12 illustrates a flow diagram of an example process for operating an electronic device based on user power consumption information according to aspects of the subject technology.

FIG. 12 illustrates a flow diagram of an example process for operating an electronic device based on user power consumption information according to aspects of the subject technology. The blocks of process 1200 are described herein as occurring in serial, or linearly. However, multiple blocks of process 1200 may occur in parallel. In addition, the blocks of process 1200 need not be performed in the order shown and/or one or more blocks of process 1200 need not be performed and/or can be replaced by other operations.

In the example of FIG. 12, at block 1202, an electronic device (e.g., electronic device 100) may obtain user power consumption information for a user account (e.g., user account 210) of the electronic device. For example, the user power consumption information may include a frequency with which the electronic device consumes a predefined fraction of a full battery charge of a battery (e.g., battery 200) of the electronic device or a frequency with which the charge of the battery falls below a threshold. In one or more implementations, obtaining the user power consumption information may include obtaining an update to previously obtained user power consumption information. In one or more implementations, the user power consumption information may be user power consumption information for a user account of multiple user accounts of the electronic device. In one or more implementations, the user power consumption information may correspond to user power consumption across the electronic device and one or more other devices associated with the user account. For example, the user power consumption information may include a frequency with which the electronic device and one or more other devices consumes a predefined fraction of a full battery charge of a battery of the respective device, or a frequency with which the charge of the battery of the respective device falls below a threshold At block 1204, the electronic device may determine, based on the user power consumption information, a user power consumption category for the user account. As examples, the electronic device may determine that the user account is in a high power consumption category, a medium power consumption category, or a low power consumption category (e.g., as described herein in connection with FIG. 8).

At block 1206, the electronic device may identify at least one power consuming process (e.g., power consuming process 902) of the electronic device. As examples, the at least one power consuming process may include a visual arrangement of graphical elements, a process for operating a display such as display 110, a process for operating another hardware or logical component of the electronic device, or generally any process that consumes power (e.g., from a battery, such as battery 200, of the electronic device). In one or more implementations, the at least one power consuming process is a background process of the electronic device. For example, the background process may be a process for operating the pixels of a display, an operating system process, or a processes for generating a graphical display element and/or a stack of graphical display elements. For example, the background process may be a process that is not caused by a user input and/or that is unrelated to user interaction with an application.

At block 1208, the electronic device may determine a modification of the at least one power consuming process based on the identified user power consumption category. For example, the electronic device may determine that the power consumption by the power consuming process is to be increased or decreased.

At block 1210, the electronic device may apply the modification to the at least one power consuming process of the electronic device (e.g., as described herein in connection with FIG. 9). In one or more implementations, applying the modification to the at least one power consuming process of the electronic device may include updating a previous setting generated by the electronic device in associated with the at least one power consuming process and based on the previously obtained user power consumption information. As examples, the previous setting may be a number of graphical elements in a visual arrangement of graphical elements, a particular subset of applications for which graphical elements are included in a visual arrangement of graphical elements, an order of graphical elements in a stack of graphical elements, a display setting, a sensor setting, or any other setting for operation of the electronic device.

In various implementations, applying the modification to the at least one power consuming process can include modifying the at least one power consuming process to reduce power consumption (e.g., when the user power consumption information indicates that the user is a high power consumption user) or modifying the at least one power consuming process to increase power consumption (e.g., when the user power consumption information indicates that the user is a low or medium power consumption user).

For example, the electronic device (e.g., recommendation engine 900) may determine (e.g., at block 1204), based on the user power consumption information, that the user account is in a high power consumption category. In this example, identifying the at least one power consuming process of the electronic device at block 1204 may include identifying the at least one power consuming process of the electronic device as a high power consumption process of the electronic device. In this example, applying the modification to the at least one power consuming process at block 1206 may include reducing power consumption of the at least one power consuming process of the electronic device.

In one or more implementations in which the modification to the at least one power consuming process at block 1206 includes reducing power consumption of the at least one power consuming process of the electronic device, reducing the power consumption may include ending the at least one power consuming process or a ending portion of the at least one power consuming process.

In one or more implementations in which the modification to the at least one power consuming process at block 1206 includes reducing power consumption of the at least one power consuming process of the electronic device, the at least one power consuming process may correspond to a process, corresponding to an application (e.g., an application 206) of a subset of applications at the electronic device, for updating a graphical element of a visual arrangement (e.g., a stack 500) of a subset of graphical elements corresponding to the subset of applications that are installed at the electronic device. In these implementations in which the at least one power consuming process corresponds to a visual arrangement of graphical elements, reducing the power consumption may include removing the graphical element from the visual arrangement of the subset of graphical elements (e.g., as discussed above in connection with FIGS. 9 and 10) and/or replacing the graphical element in the visual arrangement of the subset of graphical elements with another (e.g., lower power consuming) graphical element.

In one or more implementations, the at least one power consuming process may include a display process performed using a display (e.g., display 110) of the electronic device. As an example, reducing the power consumption may include modifying (e.g., reducing) a brightness setting of the display and/or modifying (e.g., reducing) a resolution setting of the display.

In one or more implementations, the power consuming process includes a sub-process (e.g., a video module or other media display module, or another high power consumption sub-process) of an application running on the electronic device. In such implementations, applying the modification to the at least one power consuming process may include ending the sub-process while continuing operation of other portions of the application.

In one or more implementations, the electronic device may determine (e.g., at block 1204), based on the user power consumption information, that the user account is in a low power consumption category, and applying (e.g., at block 1208) the modification to the at least one power consuming process may include modifying the at least one power consuming process to improve performance of the electronic device and increase power consumption of the electronic device.

In one or more implementations in which applying the modification to the at least one power consuming process includes modifying the at least one power consuming process to improve performance of the electronic device and increase power consumption of the electronic device, the at least one power consuming process corresponds to a process, corresponding to an application of a subset of applications at the electronic device, for updating a graphical element of a visual arrangement of a subset of graphical elements corresponding to the subset of applications. In such implementations, applying the modification to the at least one power consuming process may include adding a new graphical element to the visual arrangement of the subset of the graphical elements.

In one or more implementations in which applying the modification to the at least one power consuming process includes modifying the at least one power consuming process to improve performance of the electronic device and increase power consumption of the electronic device, the at least one power consuming process corresponds to a process, corresponding to an application of a subset of applications at the electronic device, for updating a graphical element of a visual arrangement of a subset of graphical elements corresponding to the subset of applications, and the graphical element corresponds to a low power consuming underlying application, applying the modification to the at least one power consuming process may include replacing the graphical element corresponding to the low power consuming underlying application with a graphical element corresponding to a higher power consuming underlying application in the visual arrangement of the subset of the graphical elements. In one or more implementations, prior to the modifying, the electronic device may determine, based on user activity information, that the higher power consuming underlying application is of higher relevance to a user corresponding to the user account than the low power consuming underlying application. For example, the user activity information may indicate that the user accesses the higher power consuming underlying application more often than the low power consuming underlying application. In this way, the electronic device can provide an improved visual arrangement of graphical elements that is more relevant to the user, and that more efficiently utilizes the power resources of the electronic device.

As described above, aspects of the subject technology may include the collection and transfer of data from an application to other users' computing devices. The present disclosure contemplates that in some instances, this collected data may include personal information data that uniquely identifies or can be used to identify a specific person. Such personal information data can include demographic data, location-based data, online identifiers, telephone numbers, user activity data, user power consumption data, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used in generating and/or modifying a power consuming process of an electronic device based in part on user power consumption information. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates implementations in which users selectively block the use of, or access to, personal information data. That is, the present disclosure contemplates that hardware and/or software elements can be provided to prevent or block access to such personal information data. For example, in the case of generating and/or modifying a power consuming process of an electronic device based in part on user power consumption information, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 13:
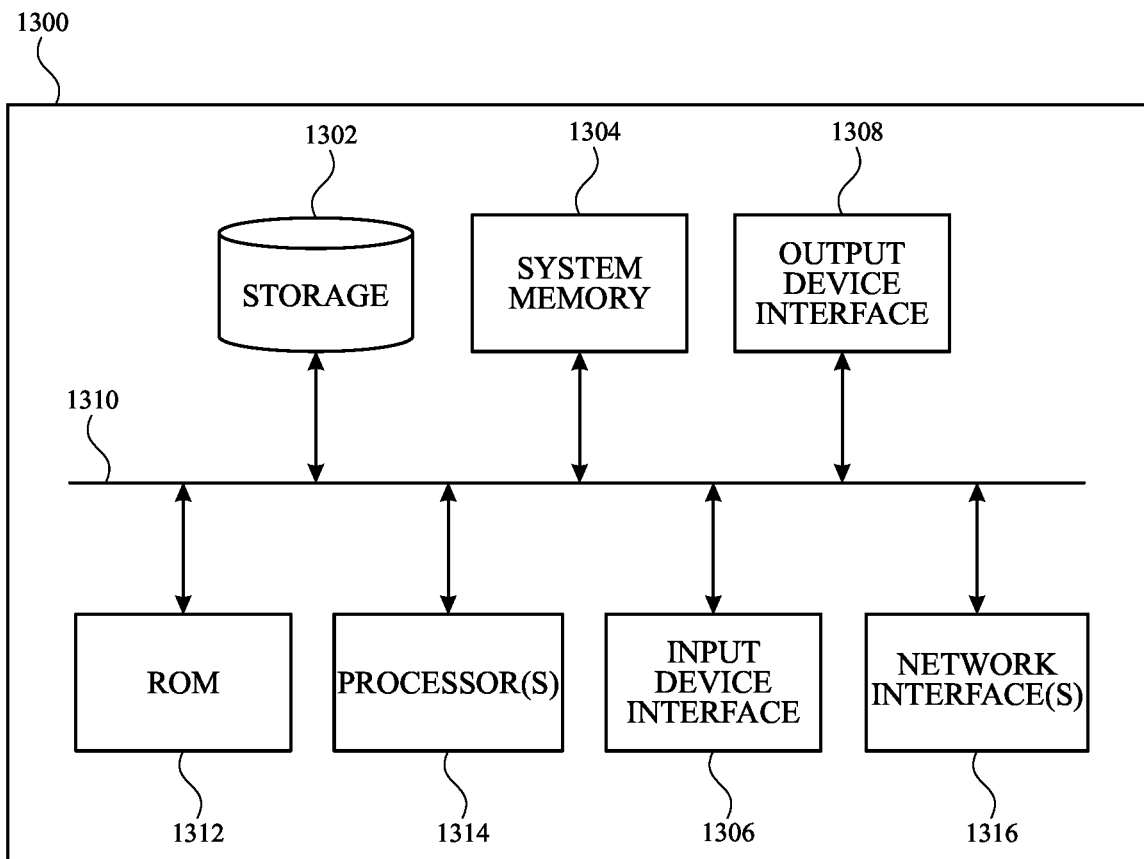
FIG. 13 illustrates an example computing device with which aspects of the subject technology may be implemented.

FIG. 13 illustrates an example computing device with which aspects of the subject technology may be implemented in accordance with one or more implementations. The computing device 1300 can be, and/or can be a part of, any computing device or server for generating the features and processes described above, including but not limited to a laptop computer, a smartphone, a tablet device, a wearable device such as smart watch, and the like. The computing device 1300 may include various types of computer readable media and interfaces for various other types of computer readable media. The computing device 1300 includes a permanent storage device 1302, a system memory 1304 (and/or buffer), an input device interface 1306, an output device interface 1308, a bus 1310, a ROM 1312, one or more processing unit(s) 1314, one or more network interface(s) 1316, and/or subsets and variations thereof.

The bus 1310 collectively represents all system, peripheral, and chipset buses that communicatively connect the numerous internal devices of the computing device 1300. In one or more implementations, the bus 1310 communicatively connects the one or more processing unit(s) 1314 with the ROM 1312, the system memory 1304, and the permanent storage device 1302. From these various memory units, the one or more processing unit(s) 1314 retrieves instructions to execute and data to process in order to execute the processes of the subject disclosure. The one or more processing unit(s) 1314 can be a single processor or a multi-core processor in different implementations.

The ROM 1312 stores static data and instructions that are needed by the one or more processing unit(s) 1314 and other modules of the computing device 1300. The permanent storage device 1302, on the other hand, may be a read-and-write memory device. The permanent storage device 1302 may be a non-volatile memory unit that stores instructions and data even when the computing device 1300 is off. In one or more implementations, a mass-storage device (such as a magnetic or optical disk and its corresponding disk drive) may be used as the permanent storage device 1302.

In one or more implementations, a removable storage device (such as a floppy disk, flash drive, and its corresponding disk drive) may be used as the permanent storage device 1302. Like the permanent storage device 1302, the system memory 1304 may be a read-and-write memory device. However, unlike the permanent storage device 1302, the system memory 1304 may be a volatile read-and-write memory, such as random access memory. The system memory 1304 may store any of the instructions and data that one or more processing unit(s) 1314 may need at runtime. In one or more implementations, the processes of the subject disclosure are stored in the system memory 1304, the permanent storage device 1302, and/or the ROM 1312. From these various memory units, the one or more processing unit(s) 1314 retrieves instructions to execute and data to process in order to execute the processes of one or more implementations.

The bus 1310 also connects to the input and output device interfaces 1306 and 1308. The input device interface 1306 enables a user to communicate information and select commands to the computing device 1300. Input devices that may be used with the input device interface 1306 may include, for example, alphanumeric keyboards and pointing devices (also called "cursor control devices"). The output device interface 1308 may enable, for example, the display of images generated by computing device 1300. Output devices that may be used with the output device interface 1308 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 13, the bus 1310 also couples the computing device 1300 to one or more networks and/or to one or more network nodes through the one or more network interface(s) 1316. In this manner, the computing device 1300 can be a part of a network of computers (such as a LAN, a wide area network ("WAN"), or an Intranet, or a network of networks, such as the Internet. Any or all components of the computing device 1300 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components (e.g., computer program products) and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
    obtaining, by an electronic device, user power consumption information for a user account of the electronic device;
    providing, at the electronic device, processing power consumption information, for each of a plurality of underlying applications at the electronic device that are each associated with a different respective displayable graphical element of a plurality of graphical elements, wherein each underlying application configured to receive and display, via their respective graphical element, updated application-specific information on the electronic device while a full user interface of each underlying application is not displayed on the electronic device, and wherein the processing power consumption information for each underlying application is based on at least one of: an update frequency with which that underlying application obtains and provides the updated application-specific information for display with its respective graphical element, an update frequency with which the updated application-specific information is displayed in the respective graphical element, and a power consumption value associated with a single instance of obtaining the updated application-specific information;
    determining, by the electronic device, a subset of the plurality of underlying applications based at least in part on the user power consumption information and the processing power consumption information; and
    displaying, by the electronic device, a visual arrangement of a subset of graphical elements of the plurality of graphical elements corresponding to the subset of the plurality of underlying applications at the electronic device.

2. The method of claim 1, wherein the processing power consumption information is predetermined.

3. The method of claim 1, wherein the processing power consumption information is determined in real-time.

4. The method of claim 1, wherein the processing power consumption information is one of static or dynamic information.

5. The method of claim 1, wherein the user power consumption information comprises a frequency with which the electronic device consumes a predefined fraction of a full battery charge of a battery of the electronic device.

6. The method of claim 1, wherein determining the subset of the plurality of underlying applications comprises determining the subset based at least in part on the user power consumption information, the processing power consumption information, and user activity information associated with one or more of the underlying applications.

7. The method of claim 6, wherein determining the subset of the plurality of underlying applications comprises:
    determining, based on the user activity information, a candidate subset of the plurality of underlying applications, the candidate subset including a first subset of the underlying applications; and
    removing at least one of the first subset of the underlying applications from the candidate subset based on the user power consumption information and the processing power consumption information for the at least one of the first subset of the underlying applications.

8. The method of claim 7, wherein removing the at least one of the first subset of the underlying applications from the candidate subset comprises:
    determining, based on the user power consumption information, that the user account is in a high power consumption category; and
    determining, based on the processing power consumption information, that the at least one of the first subset of the underlying applications is a high power consumption underlying application.

9. The method of claim 8, further comprising replacing the at least one of the first subset of the underlying applications with a low power consumption one of the underlying applications.

10. The method of claim 7, wherein removing the at least one of the first subset of the underlying applications comprises:

determining, based on the user power consumption information, that the user account is in a low power consumption category; and determining, based on the processing power consumption information, that the at least one of the first subset of the underlying applications is a low power consumption underlying application.

11. The method of claim 10, further comprising replacing, in the candidate subset, the at least one of the first subset of the underlying applications with a high power consumption underlying application.

12. The method of claim 6, wherein determining the subset of the plurality of underlying applications comprises:
determining a candidate subset including a first subset of the underlying applications,
determining, based on the user power consumption information, that the user account is in a high power consumption category;
determining, based on the processing power consumption information, that an overall power consumption of the first subset of the underlying applications exceeds a threshold that corresponds to the high power consumption category; and
modifying the first subset of the underlying applications based the overall power consumption exceeding the threshold.

13. The method of claim 1, further comprising:
while the visual arrangement of the subset of the graphical elements is displayed by the electronic device, obtaining updated user power consumption information for the user account; and
modifying the subset of the graphical elements based on the updated user power consumption information.

14. An electronic device, comprising:
a memory storing a user account; and
one or more processors configured to:
obtain user power consumption information for the user account;
provide, at the electronic device, processing power consumption information, for each of a plurality of underlying applications at the electronic device that are each associated with a different respective displayable graphical element of a plurality of graphical elements,
wherein each underlying application configured to receive and display, via their respective graphical element, updated application-specific information on the electronic device while a full user interface of each underlying application is not displayed on the electronic device, and wherein the processing power consumption information for each underlying application is based on at least one of: an update frequency with which that underlying application obtains and provides the updated application-specific information for display with its respective graphical element, an update frequency with which the updated application-specific information is displayed in the respective graphical element, and a power consumption value associated with a single instance of obtaining the updated application-specific information;
determine a subset of the plurality of underlying applications based at least in part on the user power consumption information and the processing power consumption information; and
display a visual arrangement of a subset of graphical elements of the plurality of graphical elements corresponding to the subset of the plurality of underlying applications at the electronic device.

15. The electronic device of claim 14, wherein the user power consumption information comprises a frequency with which the electronic device consumes a predefined fraction of a full battery charge of a battery of the electronic device.

16. The electronic device of claim 14, wherein the one or more processors are configured to determine the subset of the plurality of underlying applications based at least in part on the user power consumption information, the processing power consumption information, and user activity information associated with one or more of the underlying applications.

17. The electronic device of claim 14, wherein the one or more processors are further configured to:
while the visual arrangement of the subset of the graphical elements is displayed by the electronic device, obtain updated user power consumption information for the user account; and
modify the subset of the graphical elements based on the updated user power consumption information.

18. A non-transitory machine-readable medium storing instructions which, when executed by one or more processors, cause the one or more processors to perform operations comprising:
obtaining, by an electronic device, user power consumption information for a user account of the electronic device;
providing, at the electronic device, processing power consumption information, for each of a plurality of underlying applications at the electronic device that are each associated with a different respective displayable graphical element of a plurality of graphical elements,
wherein each underlying application configured to receive and display, via their respective graphical element, updated application-specific information on the electronic device while a full user interface of each underlying application is not displayed on the electronic device, and wherein the processing power consumption information for each underlying application is based on at least one of: an update frequency with which that underlying application obtains and provides the updated application-specific information for display with its respective graphical element, an update frequency with which the updated application-specific information is displayed in the respective graphical element, and a power consumption value associated with a single instance of obtaining the updated application-specific information;
determining, by the electronic device, a subset of the plurality of underlying applications based at least in part on the user power consumption information and the processing power consumption information; and
displaying, by the electronic device, a visual arrangement of a subset of graphical elements of the plurality of graphical elements corresponding to the subset of the plurality of underlying applications at the electronic device.

* * * * *

UNITED STATES PATENT AND TRADEMARK OFFICE
CERTIFICATE OF CORRECTION

PATENT NO. : 11,886,270 B2
APPLICATION NO. : 17/679049
DATED : January 30, 2024
INVENTOR(S) : Kartik R. Venkatraman et al.

It is certified that error appears in the above-identified patent and that said Letters Patent is hereby corrected as shown below:

In the Claims

Column 27, Line 24 (Claim 12): "based the" should read --based on the--.

Signed and Sealed this
Twenty-third Day of April, 2024

*Katherine Kelly Vidal*

Katherine Kelly Vidal
*Director of the United States Patent and Trademark Office*